United States Patent
Lee et al.

(10) Patent No.: US 12,436,246 B2
(45) Date of Patent: Oct. 7, 2025

(54) SENSOR TRIGGERING TO SYNCHRONIZE SENSOR DATA

(71) Applicant: Pony AI Inc., Grand Cayman (KY)

(72) Inventors: Stephen Lee, Fremont, CA (US); Yuning Yang, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 1117 days.

(21) Appl. No.: 17/325,096

(22) Filed: May 19, 2021

(65) Prior Publication Data
US 2022/0373661 A1   Nov. 24, 2022

(51) Int. Cl.
| | | |
|---|---|---|
| G01S 7/497 | (2006.01) | |
| G01C 25/00 | (2006.01) | |
| G01S 7/4865 | (2020.01) | |
| G01S 17/86 | (2020.01) | |
| G01S 17/894 | (2020.01) | |
| G01S 17/931 | (2020.01) | |

(52) U.S. Cl.
CPC .............. *G01S 7/497* (2013.01); *G01C 25/00* (2013.01); *G01S 7/4866* (2013.01); *G01S 17/86* (2020.01); *G01S 17/894* (2020.01); *G01S 17/931* (2020.01)

(58) Field of Classification Search
CPC ...... G01C 25/00; G01S 7/4866; G01S 13/931
See application file for complete search history.

(56) References Cited

U.S. PATENT DOCUMENTS

| | | | | |
|---|---|---|---|---|
| 2015/0237479 | A1* | 8/2015 | Fung | G06T 7/246 |
| | | | | 455/456.6 |
| 2021/0190923 | A1* | 6/2021 | Golomedov | G01S 17/42 |
| 2021/0263157 | A1* | 8/2021 | Zhu | G01S 17/89 |

OTHER PUBLICATIONS

Dewesoft—use GPS for timing and synchronization (Year: 2018).*

* cited by examiner

*Primary Examiner* — Mohamed Charioui
(74) *Attorney, Agent, or Firm* — Sheppard, Mullin, Richter & Hampton LLP; Xin Xie

(57) ABSTRACT

A computing device triggers a sensor operation. The computing device includes one or more processors and instructions or logic that, when executed by the one or more processors, implements computing functions. The computing device performs receiving timestamps from a sensor, simulating an operation of the sensor, the simulation including predicting orientations of the sensor at different times based on the received timestamps, comparing a latest timestamp of the computing device to a latest timestamp of the sensor, and based on the comparison, triggering a second sensor to perform an operation.

20 Claims, 7 Drawing Sheets

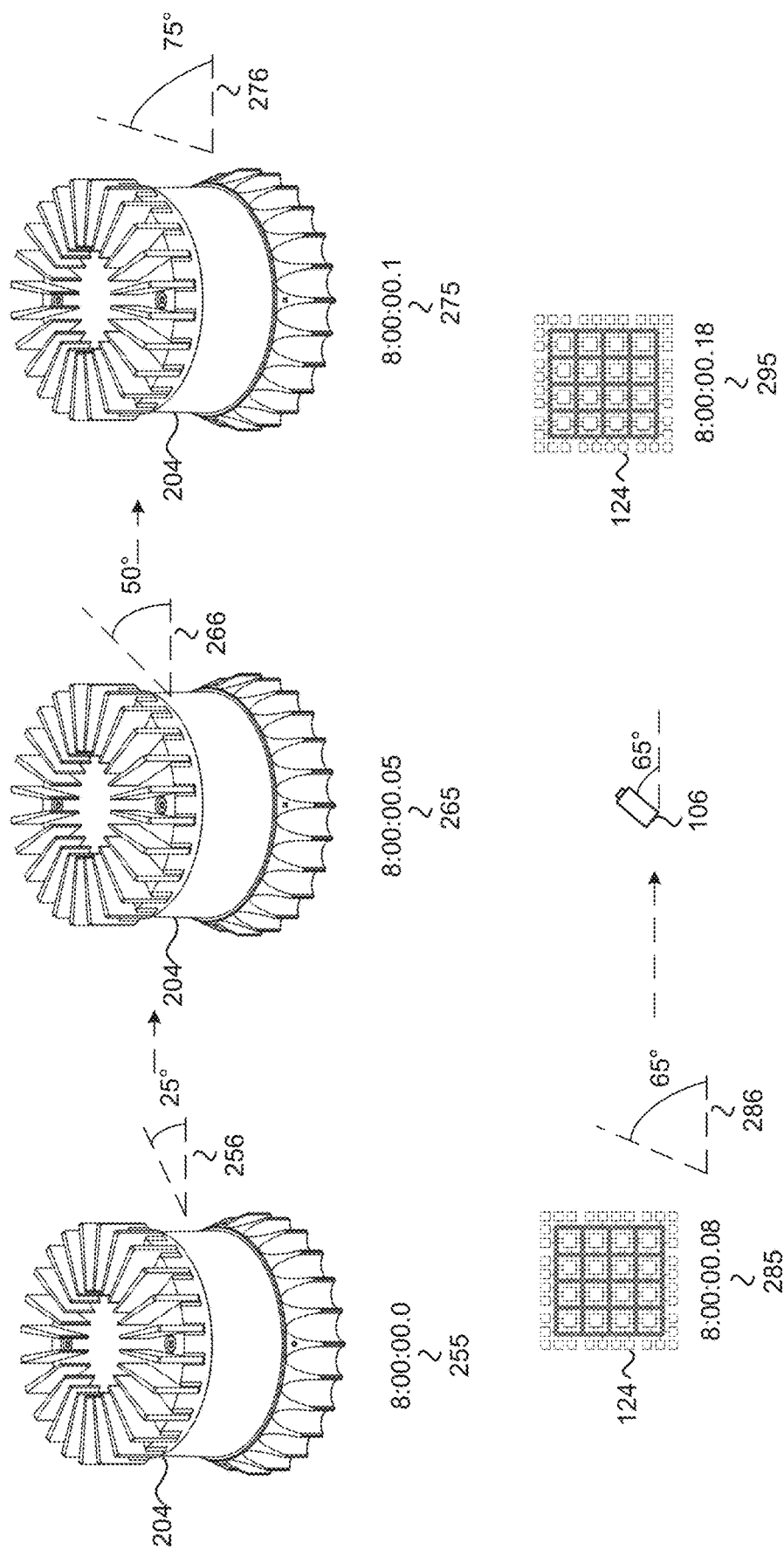

SENSOR TRIGGERING TO SYNCHRONIZE SENSOR DATA

BACKGROUND

On-board sensors in a vehicle, such as an autonomous vehicle (AV) or semi-autonomous vehicle, supplement and bolster the vehicle's field of view (FOV) by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board sensors include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, LiDAR point cloud data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle. The sensor data may then be processed to calculate various vehicle parameters and determine safe driving operations of the vehicle.

Sensor data from sensors of distinct modalities may be fused. For example, sensor data from a camera and a LiDAR sensor may be fused in order to enhance and/or complement the sensor data from different sensors. In order for the sensor data to be accurately and reliably fused, the sensor data from the different sensors should capture or represent a common region. In particular, the different sensors should be aligned in order for the data from the different sensors to be fused. Perhaps more importantly, the sensor data from the different sensors needs to be actually captured. For example, if a LiDAR sensor captures sensor data but a camera fails to trigger and/or capture sensor data, then the sensor data cannot be fused.

SUMMARY

Described herein, in some embodiments, is a computing device configured to trigger a sensor operation, which may include, for example, an indication to commence capturing sensor data. In some embodiments, the computing device includes one or more processors and logic and/or instructions that, when executed by the one or more processors, cause the computing device to perform receiving timestamps from a sensor. The logic and/or instructions further cause the computing device to perform simulating an operation of the sensor, the simulation including predicting orientations of the sensor at different times based on the received timestamps. The logic and/or instructions further cause the computing device to perform comparing a latest timestamp of the computing device to a latest timestamp of the sensor. The logic and/or instructions further cause the computing device to perform, based on the comparison, triggering a second sensor to perform an operation. In some embodiments, the logic and/or instructions may be stored non-transitory storage media, or may be uploaded, electronically wired, and/or coded into the processors.

In some embodiments, the comparison of the latest timestamp of the computing device to the latest timestamp of the sensor includes determining whether the latest timestamp of the computing device is after the latest timestamp of the sensor, determining whether the latest timestamp of the computing device is within a threshold value of the latest timestamp of the sensor, and in response to determining that the latest timestamp of the computing device is after the latest timestamp of the sensor and within the threshold value of the latest timestamp of the sensor, validating the latest timestamp of the computing device.

In some embodiments, the triggering of the second sensor includes, in response to validating the latest timestamp of the computing device, triggering the second sensor based on the latest timestamp of the computing device.

In some embodiments, the comparison further includes, in response to determining that the latest timestamp of the computing device is before or a same as the latest timestamp of the sensor or outside of the threshold value of the latest timestamp of the sensor, determining that the latest timestamp of the computing device is invalid.

In some embodiments, the triggering of the second sensor includes, in response to determining that the latest timestamp of the computing device is invalid, triggering the second sensor based on a most recent timestamp of the sensor that falls within the threshold value of a corresponding timestamp of the computing device.

In some embodiments, the triggering of the second sensor includes, in response to determining that the latest timestamp of the computing device is invalid, triggering the second sensor based on a most recent timestamp of the sensor that falls within the threshold value of a corresponding timestamp of the computing device, or based on the corresponding timestamp of the computing device, depending on whether historical timestamps of the sensor or historical timestamps of the computing device have smaller deviations compared to timestamps from a GPS.

In some embodiments, the sensor includes a LiDAR sensor and the second sensor includes a camera, and the camera is stationary.

In some embodiments, the triggering includes, determining when a predicted orientation of the sensor matches an orientation of the second sensor, and in response to the predicted orientation of the sensor matching the orientation of the second sensor, triggering the second sensor to begin capturing sensor data.

In some embodiments, the predicting of the orientations of the sensor is based on an assumption that the sensor rotates at a constant angular velocity.

In some embodiments, the instructions or logic further cause the computing device to perform, periodically resynchronizing timestamps from the computing device based on a PPS signal from a GPS.

Various embodiments of the present disclosure provide a method implemented by a computing system as described above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A-2B illustrate implementations that depict mechanisms of predicting, inferring, or determining an angle, orientation, direction, or position of a sensor, and triggering of a second sensor, in accordance with FIGS. 1A-1C, and in accordance with an example embodiment of the present disclosure. In FIG. 2A, a computing device determines that a latest timestamp of the computing device is valid, whereas in FIG. 2B, a computing device determines that a latest timestamp of the computing device is invalid.

Table 1 illustrates exemplary parameters used to configure a computing device that triggers a sensor operation.

Table 2 illustrates port interfaces including a configuration of pins on a computing device and a number of pins occupied by each signal.

Table 3 illustrates how memory may be allocated to store data associated with the triggering of a sensor operation.

DETAILED DESCRIPTION

A computing system of a vehicle receives inputs of data and processes the data upon receipt. In some embodiments, the data may include sensor data such as camera data, LiDAR data, radar data, GPS data, and/or data from sonars, ultrasonic sensors, IMUs, FIR sensors, accelerometers, gyroscopes, or magnetometers. One implementation in which the sensor data is processed includes fusing or integrating data from different sensor modalities. For example, data from a camera and a LiDAR may be fused. In order for the data from the different sensor modalities to be fused, the sensors which captured the data should be aligned or nearly aligned, or else the fused data may be faulty. Moreover, the sensor data from the different sensors must actually be captured. In some examples, a computing device may trigger a sensor, such as a camera, to capture data when the sensor is predicted to be aligned with an other sensor. If the sensor is not triggered, then the sensor may not capture sensor data. In some embodiments, the computing device may transmit a trigger to the sensor prior to alignment to account for a time consumed by transmission of the trigger signal and/or a time consumed by one or more operations of the sensor prior to the sensor capturing the sensor data. In such a manner, the capturing of sensor data from different sensors may be synchronized before the sensor data is to be aligned. Mechanisms to synchronize the capturing of data from different sensors are described in application Ser. No. 16/777,349, filed on Jan. 30, 2020, which is hereby incorporated by reference in its entirety.

Figure 1A:
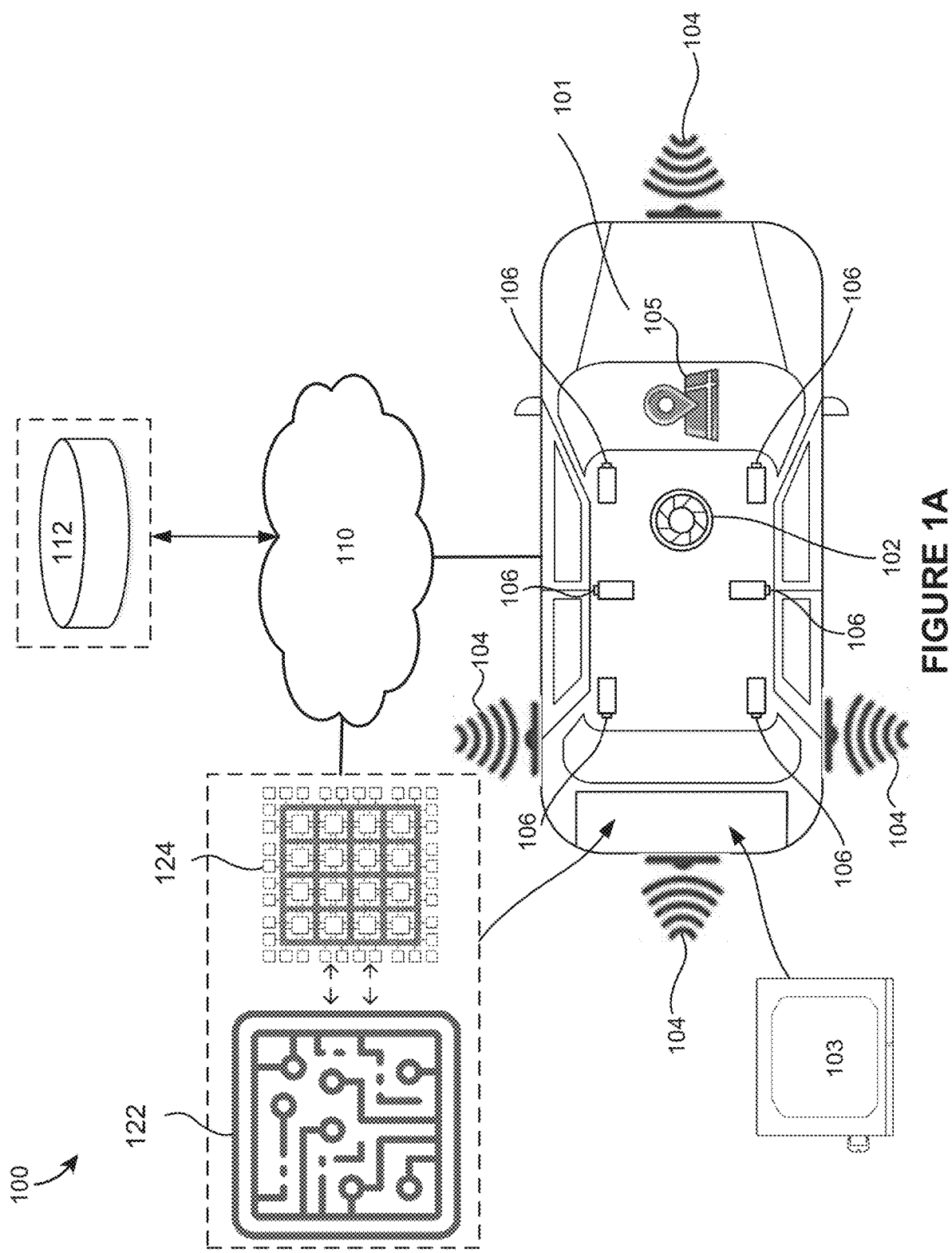
FIG. 1A illustrates an example environment of a system that acquires sensor data, and triggers a sensor operation. In some embodiments, the example environment of FIG. 1A may be applicable to a synchronization of sensor data from different sensors and processing of the synchronized sensor data.

FIG. 1A illustrates an example environment 100 of a system that acquires sensor data, synchronizes sensor data from different sensors, and processes the synchronized sensor data. In FIG. 1A, a vehicle 101 such as an autonomous vehicle may include sensors such as LiDAR sensors 102, an inertial measurement unit (IMU) 103, radar sensors 104, a GPS or GNSS sensor (hereinafter "GPS sensor") 105, cameras 106, accelerometers, gyroscopes, magnetometers, and FIR (far infrared) sensors to detect and identify objects in a surrounding environment. The LiDAR sensors 102 may periodically scan an environment around a vehicle by transmitting pulses of light at periodic intervals as the LiDAR moves along the scan path. The LiDAR sensors 102 may measure differences in return times and wavelengths for the light that is reflected back to the LiDAR and generate digital three-dimensional (3D) representations of targets that were illuminated by the light pulses. More specifically, a LiDAR sensor may generate a 3D point cloud (a set of data points in space) representative of a target object that it has illuminated with light during its scan path. Other forms of sensor data acquired and/or processed from other sensors may include pictorial or image data such as pictures or videos, audio data, audiovisual data, timestamp data, and/or other data indicating a position and/or pose of the vehicle 101 captured in either real-time or with a time delay. The vehicle 101 can also include myriad actuators to propel and navigate the vehicle 101 in the surroundings. Such actuators may include, for example, any suitable electro-mechanical devices or systems such as actuators including drive-by-wire (DBW) actuators to control a throttle response, a braking action, a steering action, etc.

The environment 100 may also include one or more servers 112 accessible to a computing system 122. The one or more servers 112 may store frames of data from the sensors of the vehicle 101. The one or more servers 112 may be accessible to the computing system 122 either directly or over the communication network 110. In some instances, the one or more servers 112 may include federated data stores, databases, or any other type of data source from which data may be stored and retrieved, for example. In some embodiments, the one or more servers 112 may store raw sensor data, preprocessed sensor data, processed sensor data, and/or integrated or fused sensor data.

In some implementations, the one or more servers 112 may store point clouds which may be registered, or post-processed global navigation satellite system (GNSS)-inertial navigation system (INS) data. In general, a user operating a computing device can interact with the computing system 122 over the communication network 110, for example, through one or more graphical user interfaces and/or application programming interfaces. The computing system 122 may include one or more processors such as a graphics processing unit (GPU) and/or a central processing unit (CPU). The computing system may be part of an inter-process communication (IPC) system. The computing system 122 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the computing system 122 may include multiple types of processing units such as GPUs and CPUs potentially distributed across multiple computing devices and in communication with one another via one or more communication buses. The computing system 122 may perform processing of sensor data, such as, fusing or integrating the sensor data, analyzing the sensor data, and/or navigation or other decision making from the sensor data. The computing system 122 may perform processing such as deep learning, which may include functions of convolutional neural networks (CNNs). The functions of the computing system 122 will be described further in the subsequent figures. Engines/program modules as described below can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. A system or device described herein as being configured to implement example embodiments of the invention can include one or more processing circuits, each of which can include one or more processing units or cores. Computer-executable instructions can include computer-executable program code that when executed by a processor core can cause input data contained in or referenced by the computer-executable program code to be accessed and processed by the processor core to yield output data. In some embodiments, the computing system 122 may include general purpose logic and may be non-cycle accurate.

In some embodiments, a computing device 124 may simulate an operation of a sensor, such as a LiDAR sensor, which may include one of the LiDAR sensors 102. For example, the computing device 124 may simulate or predict an angle and/or position of the sensor at different times. Otherwise, an angle and/or position of the sensor at different times may not be known. Based on the simulated or predicted angle and/or position of the sensor, such as the LiDAR sensor, and a position or angle of an other sensor, such as a camera, the computing device 124 may predict and/or determine when the sensor, such as the LiDAR sensor, is aligned with the other sensor, such as the camera. Then, the computing device 124 may trigger the other sensor to commence capturing of the sensor data upon predicting that the other sensor is aligned with, or will be aligned with, the sensor. In some embodiments, the computing device 124 may transmit a trigger signal to the other sensor to account for a transmission time or transmission delay of the trigger signal and/or a time or delay for the other sensor to prepare to capture sensor data. For example, in a scenario of a camera, the camera may need to prepare to capture image data using a rolling shutter. In some embodiments, the computing device 124 may also trigger the other sensor to stop capturing the sensor data upon predicting that the other sensor is, or will fall, out of alignment with the sensor. The computing device 124 may record corresponding times at which the other sensor is capturing the sensor data. Once the sensor and the other sensor have captured one or more frames of data, the sensor and the other sensor may transmit the captured frames of data into a memory, such as memory associated with an IPC (inter-process communication) of the computing system 122, so that the computing system 122 may process the captured frames of data. In some embodiments, the computing device 124 may trigger operations of multiple sensors, in which the computing device 124 separately triggers each sensor to capture data upon alignment of each sensor to the sensor, which may be, for example, the LiDAR sensor, using the above mechanisms. In some embodiments, the computing device 124 may include a field-programmable gate array (FPGA) including custom logic specifically configured to perform a particular task or tasks. In some embodiments, the computing device 124 may be cycle accurate. Further details of the computing device 124 will be described below.

Figure 1B:
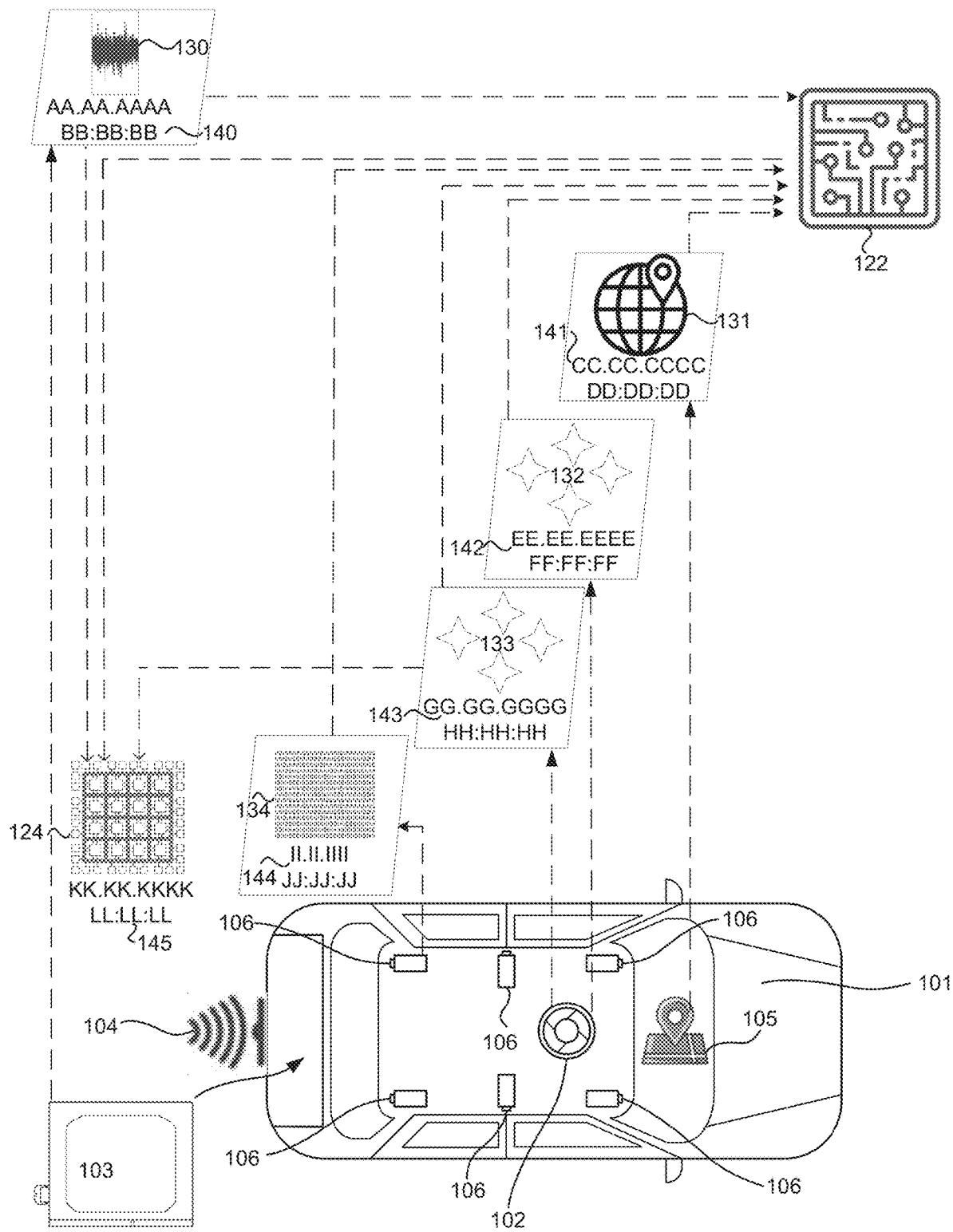
FIG. 1B illustrates a hybrid data flow and block diagram that depicts a system that acquires sensor data and triggers a sensor operation. In some embodiments, the hybrid data flow and block diagram of FIG. 1B may be applicable to a synchronization of sensor data from different sensors and processing of the synchronized sensor data.

FIG. 1B illustrates a hybrid data flow and block diagram that illustrates acquiring of sensor data from the vehicle 101, synchronizing the sensor data from different sensors, and processing the synchronized sensor data from the vehicle 101, in accordance with an example embodiment. In some embodiments, the sensor data from the vehicle 101 may include odometry data 130 and 131 from the IMU 103 and the GPS sensor 105, respectively, and having respective timestamps 140 and 141. The sensor data may further include two-dimensional (2-D) or three-dimensional (3-D), or 2-D/3-D point cloud frames 132 and 133 captured by the LiDAR sensors 102 and having respective timestamps 142 and 143. The sensor data may further include camera data 134 captured by the camera 106 and having a timestamp 144. In some embodiments, internal timers of each of the IMU 103, the GPS sensor 105, the LiDAR sensors 102, and the camera 106 may be separate and discrete. Thus, each of the timestamps 140-144 may be generated by an independent timer. In some embodiments, the computing device 124 also includes its own independent timer, and may generate its own independent timestamp 145.

The foregoing is described within an implementation that determines when a camera is aligned with a LiDAR in order to trigger a camera to capture data during that time period. However, other implementations that involve other combinations of sensors are also contemplated. The computing device 124 may determine a validity of the timestamp 145 by comparing the timestamp 145 with a timestamp from another sensor, such as, one or both of the timestamps 142 and 143 from the point cloud frames 132 and 133. In some embodiments, some or all of the timestamps 140-145 may be most recent timestamps from the respective sensors. For example, the timestamp 145 may be a most recent timestamp of the computing device 124. The timestamps 142 and 143 may be most recent timestamps of the point cloud frames 132 and 133. The computing device 124 may obtain the timestamps 142 and/or 143 through an inter-process communication, for example, indirectly via the computing system 122. If the timestamp 145 comes after one or both of the timestamps 142 and 143, the computing device 124 may determine that the timestamp 145 is valid, because the timestamp 145 further incorporates transmission delays of the timestamps 142 and 143 from the LiDAR sensors 102 to the computing system 122, then to the computing device 124, and delays between capturing and forwarding of the timestamps 142 and 143 at, or within, the LiDAR sensors 102. Thus, the timestamp 145 should come after the timestamps 142 and 143. In some embodiments, if the computing device 124 determines that the timestamp 145 is valid, the computing device 124 utilizes the timestamp 145 to determine an angle or position of a LiDAR sensor. In alternative embodiments, if the computing device 124 determines that the timestamp 145 is valid, the computing device 124 may utilize either the timestamp 145 or one of the timestamps 142 or 143 to determine an angle or position of a LiDAR sensor, depending on which of the timestamps 142, 143, or 145 have a smallest amount of drift within a previous time period, compared to a PPS (pulse per second) signal from the GPS sensor 105, as described with reference to FIG. 1C. In some embodiments, if the computing device 124 determines that the timestamp 145 is invalid, the computing device 124 may utilize a most recent valid timestamp from the LiDAR sensor, such as, for example, either of the timestamps 142 or 143, to determine an angle or position of the LiDAR sensor. The angle or position of the LiDAR sensor may be used to determine whether and when the LiDAR sensor is aligned with the camera and thereby determine when to trigger the camera.

A criteria for determining whether the timestamp 145 is valid, for example, may be based on the timestamp 145 being greater than one or both of the timestamps 142 and 143, and the timestamp 145 being within a certain threshold of a latest timestamp out of the timestamps 142 and 143. For example, the timestamp 145 may need to be within two revolutions, or 50 milliseconds, of a latest timestamp out of the timestamps 142 and 143, in order for the timestamp 145 to be deemed valid. In particular, because the timestamp 145 incorporates further delays after the timestamps 142 and 143, the timestamp should occur after the timestamps 142 and 143. However, the amount of the delay should be within a certain threshold. The revolutions may refer to a number of revolutions of the LiDAR sensor.

Figure 1C:
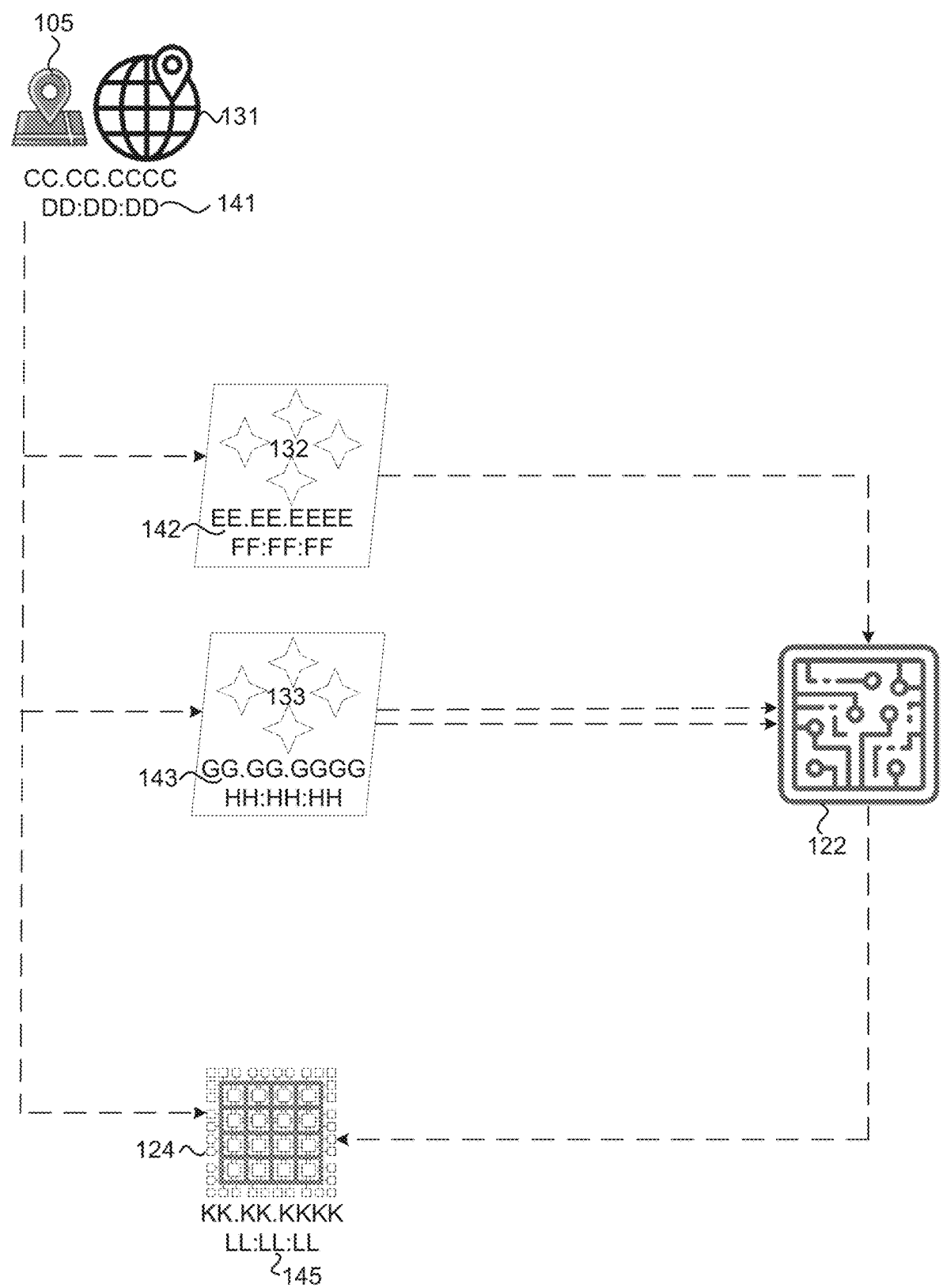
FIG. 1C illustrates a synchronization of timestamps.

FIG. 1C illustrates a synchronization of timestamps. Because each of the sensors may be controlled by discrete, individual timers, one or more of the timers may exhibit drift, malfunction, or other inaccuracies over time. Each of the sensors therefore needs to be resynchronized with a source of truth periodically. For example, in FIG. 1C, the timestamps 145 and 143 from the computing device 124 and the LiDAR sensor, respectively, and an internal timer of the computing system 122, may be resynchronized using the timestamp 141 associated with the odometry data 131 from the GPS sensor 105. The GPS sensor 105 may be a source of truth, or a global synchronization clock. The GPS sensor 105 may transmit timestamps to the LiDAR sensors 102, the computing device 124, and the computing system 122, at periodic intervals, for example, once per second. Each of the LiDAR sensors 102, the computing device 124, and the computing system 122 may adjust their respective timestamps and/or internal timers to match the periodic timestamps from the GPS sensor 105. In some embodiments, the computing device 124 may determine a drift, or deviation, of the respective timestamps and/or internal timers of the LiDAR sensors 102 and the computing device 124 compared to, or relative to, the periodic timestamps from the GPS sensor 105. For example, a drift or deviation may include an amount of adjustment made to the internal times of the LiDAR sensors 102 and the computing device 124 in order to match the periodic timestamps from the GPS sensor 105. The determined drift or deviation of the LiDAR sensors 102 and the computing device 124 may be used to determine whether to utilize either or both the timestamps 132 or 133 of the LiDAR sensors 102 or the timestamp 145 of the computing device 124 to determine an angle of the LiDAR, as referred to above. In other words, the computing device 124 may utilize a timestamp from a most accurate device, whether it is one of the LiDAR sensors 102 or the computing device 124, to predict a current LiDAR angle. In some embodiments, the computing device 124 may determine the most accurate device by determining which one of the LiDAR sensors 102 or the computing device 124 has a lowest amount of deviation or drift relative to the periodic timestamps of the GPS sensor 105 using machine learning, a histogram, and/or a rolling average. In some embodiments, the computing device 124 may select a most accurate device over a recent timespan, such as, over the last one second or the last five seconds.

Because the GPS sensor 105 resynchronizes the internal timers of each of the sensors only at periodic intervals such as once a second, and many sensor readings occur between the periodic intervals, some of the timestamps associated with sensor readings that occur between the periodic intervals may drift or otherwise be inaccurate. Even if a timestamp may be inaccurate, the computing device 124 needs to resolve the inaccuracy and/or nonetheless predict angles or positions of a sensor at particular times in order to predict when two sensors are aligned, and thereby trigger an other sensor to capture data. Thus, the computing device 124 may trigger the other sensor even if a timestamp may be inaccurate.

Figure 2A:
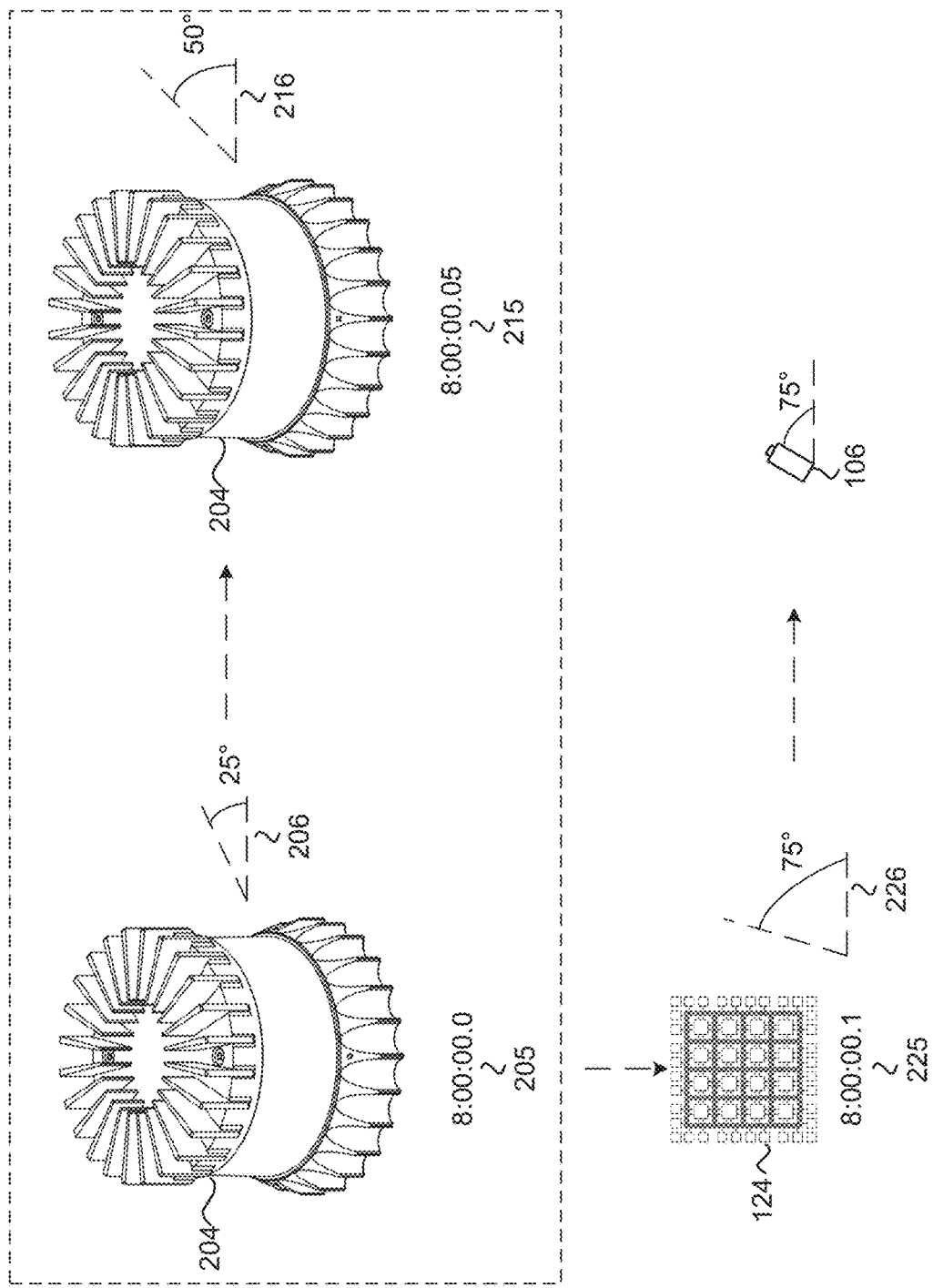

FIGS. 2A-2B illustrate scenarios of determining or predicting a current angle, position, or orientation of a LiDAR sensor and triggering a camera. In some embodiments, if the computing device 124 determines that a latest timestamp, such as the timestamp 145, is valid, then the computing device 124 may determine or predict a current angle of a LiDAR sensor based on the latest timestamp, such as the timestamp 145. In some embodiments, a current angle may refer to or correspond to a tooth of a current LiDAR sensor position. If the computing device 124 determines that a latest timestamp, such as the timestamp 145, is invalid, then the computing device 124 may determine or predict a current angle of a LiDAR sensor based on a latest timestamp of the LiDAR sensor that was validated, or that corresponds to a timestamp of the computing device 124 that was validated. FIG. 2A illustrates a scenario in which the computing device 124 determines that a latest timestamp of the computing device 124 is valid. In FIG. 2A, the computing device 124 may receive data from a LiDAR sensor 204, which may be implemented as one of the LiDAR sensors 102. The data may include historical angles and corresponding timestamps of the LiDAR sensor 204. For example, the computing device 124 may receive an indication, or otherwise have previously determined or predicted, that at a timestamp 205 indicating a time of 8:00:00.0, the LiDAR sensor 204 has an orientation 206 of 25 degrees with respect to a reference axis. The computing device 124 may also receive an indication, or otherwise have previously determined or predicted, that at a timestamp 215 indicating a time of 8:00:00.05, the LiDAR sensor 204 has an orientation 216 of 50 degrees with respect to a reference axis. In some embodiments, such data may be hardwired or otherwise programmed into the computing device 124. The computing device 124 may have a latest timestamp 225 indicating a time of 8:00:00.1, which is after the latest timestamp 215 from the LiDAR sensor 204, and within a threshold, 50 milliseconds, of the latest timestamp 215. Thus, the computing device 124 may determine that the latest timestamp 225 is valid. The computing device 124 may determine or predict an angle of the LiDAR sensor 204 at a time of 8:00:00.1. The computing device 124 may infer, predict, or determine that every 50 milliseconds, the LiDAR sensor 204 rotates by 25 degrees, based on the previous data. Thus, at 8:00:00.1, the computing device 124 may infer, predict, or determine that the LiDAR sensor 204 has an angle 226 of 75 degrees. In some embodiments, the computing device 124 may make such inference, prediction, or determination based on an assumption of a constant rotation speed of the LiDAR sensor 204 over time, for example, 25 degrees every 50 milliseconds. In other embodiments, the computing device 124 may make such inference, prediction, or determination based on an assumption of a nonconstant rotation speed of the LiDAR sensor 204 over time, or, for example, a Gaussian or other distribution of a rotation speed of the LiDAR sensor 204 over time. In some embodiments, if the LiDAR angle of 75 degrees matches an angle of the camera 106, which may also be at 75 degrees, then the computing device triggers the camera 106 to begin capturing sensor data. In some embodiments, the camera 106 may be stationary, and thus, be at a constant angle or orientation of 75 degrees.

FIG. 2B illustrates a scenario in which the computing device 124 determines that a latest timestamp of the computing device 124 is invalid. In FIG. 2B, the computing device 124 may receive data from a LiDAR sensor 204, which may be implemented as one of the LiDAR sensors 102. The data may include historical angles and corresponding timestamps of the LiDAR sensor 204. For example, the computing device 124 may receive an indication, or otherwise have previously determined or predicted, that at a timestamp 255 indicating a time of 8:00:00.0, the LiDAR sensor 204 has an orientation 256 of 25 degrees with respect to a reference axis. The computing device 124 may also receive an indication, or otherwise have previously determined or predicted, that at a timestamp 265 indicating a time of 8:00:00.05, the LiDAR sensor 204 has an orientation 266 of 50 degrees with respect to a reference axis. The computing device 124 may also receive an indication, or otherwise have previously determined or predicted, that at a timestamp 275 indicating a time of 8:00:00.1, the LiDAR sensor 204 has an orientation 276 of 75 degrees with respect to a reference axis. In some embodiments, such data may be hardwired or otherwise programmed into the computing device 124. The computing device 124 may have a latest timestamp 295 indicating a time of 8:00:00.18, which is after the latest timestamp 275 from the LiDAR sensor 204, but not within a threshold, 50 milliseconds, of the latest timestamp 215. In fact, the latest timestamp 295 deviates from the latest timestamp 275 by 80 milliseconds. Thus, the computing device 124 may determine that the latest timestamp 295 is invalid, and that the corresponding latest timestamp 275 of the LiDAR sensor 204 is also invalid. The computing device 124 may determine or predict an angle of the LiDAR sensor 204 based on the timestamp 265, which was determined to be valid, because a corresponding timestamp 285 of the computing device 124 is within the threshold of the timestamp 265. In particular, the timestamp 285 occurs after the timestamp 265 and deviates by only 30 milliseconds from the timestamp 265. The computing device 124 may infer, predict, or determine that every 50 milliseconds, the LiDAR sensor 204 rotates by 25 degrees, based on the previous data from the LiDAR sensor 204. The computing device 124 may predict, infer, or determine a current angle of the LiDAR sensor 204 using either the timestamp 265 or the timestamp 285. In some embodiments, the determination may be based on which of the LiDAR sensor 204 or the computing device 124 has a lowest amount of drift compared to a PPS signal from the LiDAR sensor 204, as described above. For example, using the timestamp 285, at 8:00:00.08, the computing device 124 may predict, determine, or infer that an angle 286 of the LiDAR sensor 204 is 65 degrees, based on an assumption of constant rotation speed of the LiDAR sensor 204 of 25 degrees every 50 milliseconds. In other embodiments, the computing device 124 may make such inference, prediction, or determination based on an assumption of a nonconstant rotation speed of the LiDAR sensor 204 over time, or, for example, a Gaussian or other distribution of a rotation speed of the LiDAR sensor 204 over time. In some embodiments, if the LiDAR angle of 65 degrees matches an angle of the camera 106, which may also be at 65 degrees, then the computing device triggers the camera 106 to begin capturing sensor data. In some embodiments, the camera 106 may be stationary, and thus, be at a constant angle or orientation of 65 degrees.

In an event of an error occurring in the computing device 124, debugging of the computing device 124 may be conducted, for example, based on a difference between a most recent timestamp of the computing device 124 and a most recent timestamp of a LiDAR sensor, a number of rotations or revolutions of the LiDAR sensor, an average spin rate of the LiDAR sensor, and/or a number of LiDAR packets received by either the computing device 124 or the computing system 122. The debugging may be performed, in some embodiments, by the computing system 122. In particular, if the most recent timestamp of the computing device 124 comes before the most recent timestamp of the LiDAR sensor, the computing system 122 may debug or troubleshoot such a scenario. The computing system 122 may further determine whether the most recent timestamp of the computing device 124 is within a threshold range or value of a timestamp of the computing system 122. If the computing system 122 makes such determination, the computing system 122 may determine that the most recent timestamp of the LiDAR sensor is a timestamp from the future. In some embodiments, the timestamp of the computing system 122 is unknown to the computing device 124, and is only known to the computing system 122. In some embodiments, the computing system 122 may further determine whether the most recent timestamp of the LiDAR sensor is within a threshold range or value of a timestamp of the computing system 122. If the computing system 122 makes such determination, and/or a determination that the most recent timestamp of the computing device 124 is before a threshold time, the computing system 122 may determine that the most recent timestamp of the computing device 124 occurs at a past time, and may diagnose that the computing device 124 is missing several instances or cycles of PPS synchronization, or has an error in a PPS synchronization feedback loop. The computing system 122 may provide a fix to the PPS synchronization feedback loop.

In other embodiments, if the most recent timestamp of the computing device 124 deviates from the most recent timestamp of the LiDAR sensor by more than a threshold, such as, more than 50 milliseconds, then the computing system 122 may debug or troubleshoot such a scenario. The computing system 122 may further determine whether the most recent timestamp of the computing device 124 is within a threshold range or value of a timestamp of the computing system 122. If the computing system 122 makes such determination, the computing system 122 may determine that the most recent timestamp of the LiDAR sensor has not been updated recently, or that the LiDAR sensor is transmitting an old timestamp that is not up-to-date. In some embodiments, the timestamp of the computing system 122 is unknown to the computing device 124, and is only known to the computing system 122. In some embodiments, the computing system 122 may further determine whether the most recent timestamp of the LiDAR sensor is within a threshold range or value of a timestamp of the computing system 122. If the computing system 122 makes such determination, the computing system 122 may determine that the timestamp of the computing device 124 is incrementing too fast due to a feedback loop of the PPS synchronization process, or that the PPS signal is toggling too frequently only to the computing device 124 and not to the LiDAR sensor.

Table 1 below shows exemplary parameters used to configure the computing device 124.

TABLE 1

| Parameter | Default Value | Description |
|---|---|---|
| TSEC_FRAC_WIDTH | 32 | Data Width Occupied for Time (in fraction of seconds) |
| TSEC_WIDTH | 32 | Data Width Occupied for Time (in seconds) |
| ANGLE_WIDTH | 16 | Data Width Occupied for Angle |
| STAT_WIDTH | 32 | Data Width Occupied for Statistics |

Table 2 below shows port interfaces including a configuration of pins on the computing device 124 and a number of pins occupied by each signal.

TABLE 2

Port Interface

| Signals | I/O | Type | Bit Width | Description |
|---|---|---|---|---|
| clk | Input | X | 1 bit | Clock |
| rst | Input | X | 1 bit | Active high reset |
| lidar_timestamp | Input | DATAPATH | TSEC_WIDTH + TSEC_FRAC_WIDTH | 64 bit historic lidar timestamp |
| lidar_angle | Input | DATAPATH | ANGLE_WIDTH | Historic lidar angle |
| lidar_valid | Input | DATAPATH | 1 bit | Lidar valid strobe |
| fpga_timestamp | Input | DATAPATH | TSEC_WIDTH + TSEC_FRAC_WIDTH | FPGA current timestamp |
| fpga_timestamp_valid | Input | DATAPATH | 1 bit | FPGA timestamp valid strobe |
| time_diff_thresh | Input | CONFIG | TSEC_WIDTH + TSEC_FRAC_WIDTH | Fpga_timestamp-lidar_timestamp must be smaller than threshold |
| Bypass_angle_correlation (dummy port) | Input | CONFIG | 1 bit | Bypass check for angle correlation |
| Angle_correlation_thresh (dummy port) | Input | CONFIG | ANGLE_WIDTH | In degrees |
| lidar_count | Output | STATUS | STAT_WIDTH | Number of times lidar packet has been forwarded by IPC |
| err_underflow | Output | STATUS | 1 bit | Assert if lidar_timestamp > fpga_timestamp |
| underflow_count | Output | STATUS | STAT_WIDTH | Count num when lidar_timestamp > fpga_timestamp |
| err_time_diff | Output | STATUS | 1 bit | Assert the overflow if fpga_timestamp-lidar_timestamp > time_diff_thresh |
| time_diff_count | Output | STATUS | STAT_WIDTH | Count num overflow when fpga_timestamp-lidar_timestamp > time_diff_thresh |
| qual_lidar_timestamp | Output | DATAPATH | TSEC_WIDTH + TSEC_FRAC_WIDTH | Qualified output lidar timestamp |
| qual_lidar_angle | Output | DATAPATH | ANGLE_WIDTH | Qualified output lidar angle |
| qual_lidar_valid | Output | DATAPATH | 1 bit | Qualified output lidar valid |
| clr_lidar_count | Input | CONFIG | 1 bit | Clear the lidar packet count |
| clr_err_underflow | Input | CONFIG | 1 bit | Clear the underflow flag |
| clr_err_underflow_cnt | Input | CONFIG | 1 bit | Clear the underflow count |
| clr_err_time_diff | Input | CONFIG | 1 bit | Clear the overflow flag |
| clr_err_time_diff_cnt | Input | CONFIG | 1 bit | Clear the overflow count |

TABLE 2-continued

Port Interface

| Signals | I/O | Type | Bit Width | Description |
|---|---|---|---|---|
| angle_interval_incr | Input | DATAPATH | ANGLE_WIDTH | angle interval increment |
| angle_interval_valid | Input | DATAPATH | 1 bit | angle interval valid |
| calc_angle | Output | DATAPATH | ANGLE_WIDTH | Calculated angle |
| calc_valid | Output | DATAPATH | 1 bit | Calculated angle valid |
| cam_trig_angle [NUM_CAMERA-1:0] | Input | CONFIG | 32 bit | The trigger angle of a camera |
| en_cam_trigger | Input | CONFIG | 1 bit | Camera trigger enable |
| cam_trigger | Output | DATAPATH | NUM_CAMERA | Camera trigger pulse |

Table 3 below shows memory allocation either in a memory associated with the computing device 124 or associated with the computing system 122, to store data associated with the mechanisms described above.

TABLE 3

| Register name | Address | Access | Description |
|---|---|---|---|
| Status | 0 × 00 | RO | Bit 0: underflow error, if lidar_timestamp > fpga_timestamp<br>Bit 1: overflow error, if fpga_timestamp-lidat_timestamp > time_diff_thresh. |
| Control | 0 × 04 | R/W | Bit 0: clear underflow error, active high,<br>Bit 1: clear overflow error, active high,<br>Bit 2: clear underflow count, active high<br>Bit 3: clear overflow count, active high,<br>Bit 4: clear received lidar timestamp count<br>Bit 5: Camera trigger enable |
| Underflow count | 0 × 08 | RO | Number of counts when lidar_timestamp > fpga_timestamp. |
| Overflow count | 0 × 0C | RO | Number of counts when fpga_timestamp-lidar_timestamp > time_diff_thresh. It is reset to 0 by writing 1 to the overflow error register. |
| Lidar count | 0 × 10 | RO | Number of times lidar packet has been forwarded by IPC. |
| Timestamp threshold | 0 × 14 | R/W | Fpga_timestamp-lidar timestamp must be smaller than the threshold, time_diff_thresh. |
| Angle interval increment | 0 × 18 | R/W | Angle interval increment. |
| Camera trigger angle[i] | 0 × 20 + i*4 | R/W | The angle at which camera i is triggered. |

Figure 3:
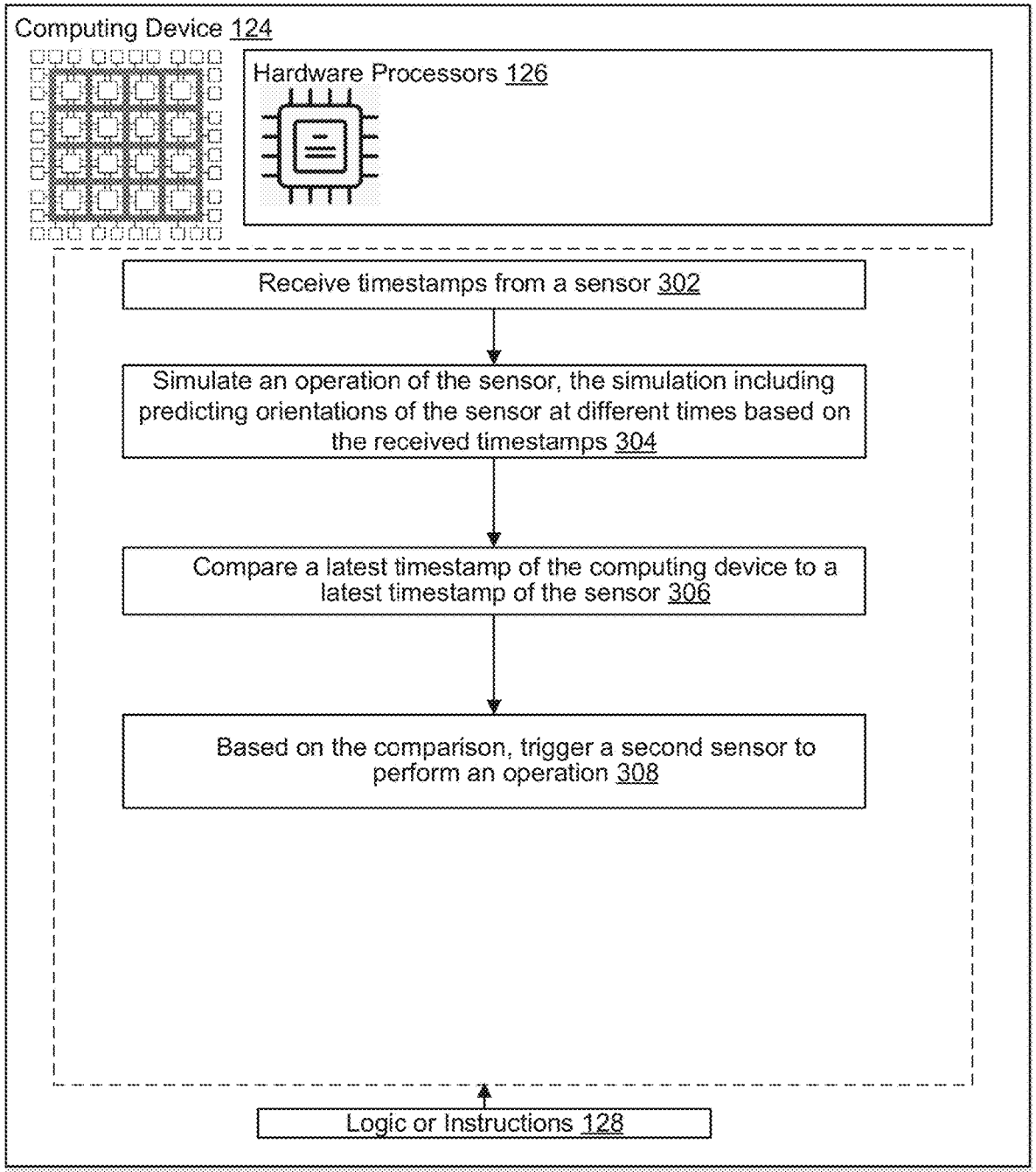
FIG. 3 illustrates a flowchart of a sensor triggering method, in accordance with an example embodiment of the present disclosure.

FIG. 3 illustrates a flowchart 300 of a method of triggering a sensor operation, as well as associated steps, as performed by the computing device 124. The computing device 124 may include one or more hardware processors 126, which may be implemented, for example, as one or more processor cores. The computing device 124 may further include logic or instructions 128 that, when executed by the one or more hardware processors 126, cause the computing device 124 to perform particular functions. In some embodiments, the logic or instructions 128 may include hardware description languages (HDLs). In step 402, the computing device 124 may receive timestamps from a sensor. In step 404, the computing device 124 may simulate an operation of the sensor, the simulation including predicting orientations of the sensor at different times based on the received timestamps. In step 406, the computing device 124 may compare a latest timestamp of the computing device to a latest timestamp of the sensor. In step 408, the computing device 124 may, based on the comparison, trigger a second sensor to perform an operation.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 4:
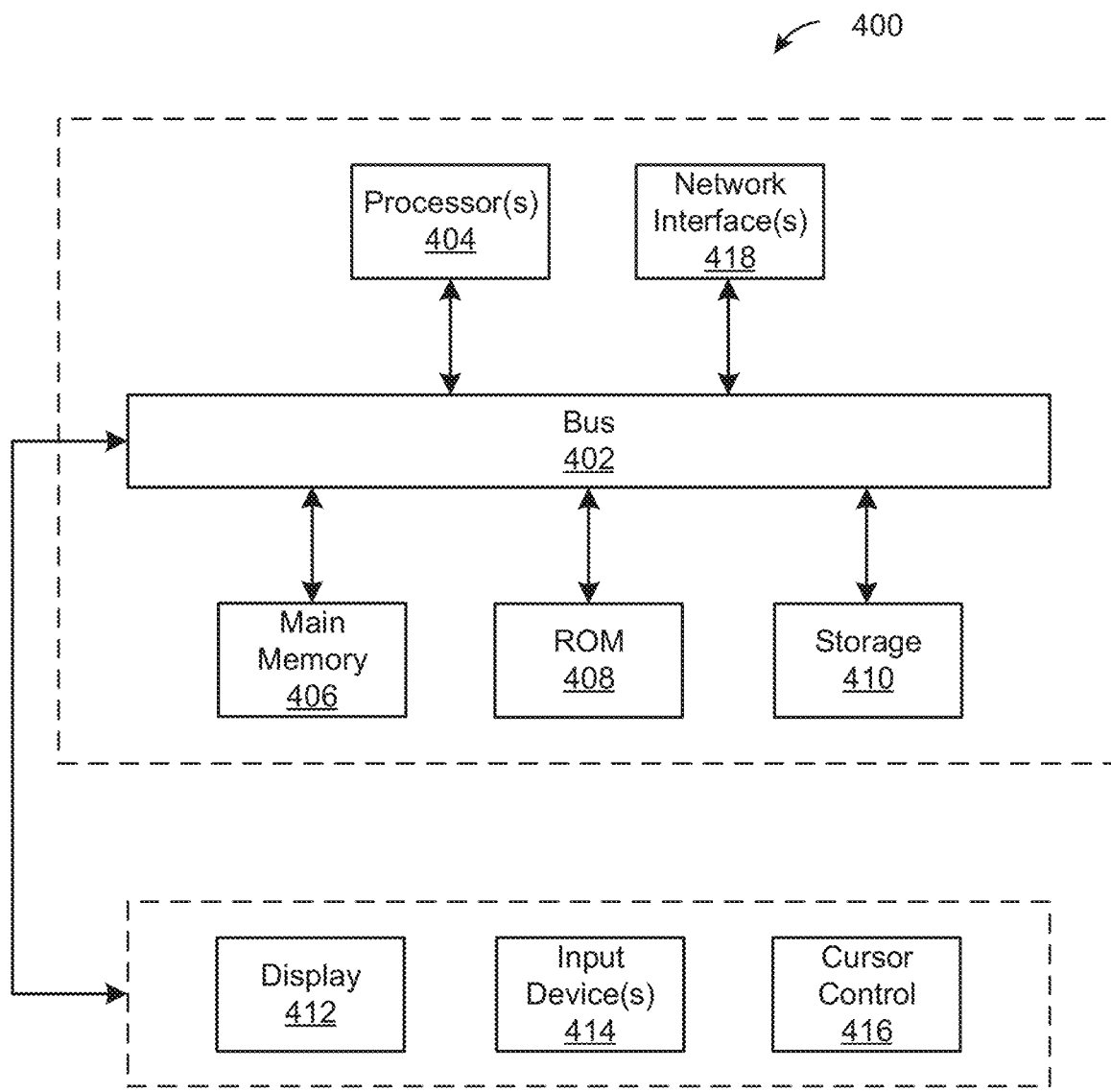
FIG. 4 illustrates a block diagram of a computer system upon which any of the embodiments described herein may be implemented.

FIG. 4 illustrates a block diagram of a computer system 400 upon which any of the embodiments described herein may be implemented. For example, a subset or an entirety of the computer system 400 may be implemented in the computing system 122. The computer system 400 includes a bus 402 or other communication mechanism for communicating information, one or more hardware processors 404 coupled with bus 402 for processing information. A description that a device performs a task is intended to mean that one or more of the hardware processor(s) 404 performs that task. The hardware processor(s) 404 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor(s) 404 may also combine custom hard-wired logic, ASICs, or FPGAs with custom programming to accomplish the techniques. The hardware processor(s) 404 can include any suitable processing unit capable of accepting data as input, processing the input data in accordance with stored computer-executable instructions, and generating output data. The hardware processor(s) 404 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 404 can have any suitable microarchitecture design that includes any number of constituent components such as, for example, registers, multiplexers, arithmetic logic units, controllers for controlling read/write operations to memory, branch predictors, or the like. The microarchitecture design of the hardware processor(s) 404 can be made capable of supporting any of a variety of instruction sets.

The computer system 400 also includes a main memory 406, such as a dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to output device(s) 412, such as a cathode ray tube (CRT) or LCD display (or touch screen), for displaying information to a computer user. Input device(s) 414, including alphanumeric and other keys, are coupled to bus 402 for communicating information and command selections to processor 404. Another type of user input device is cursor control 416. The computer system 400 also includes a communication interface 418 coupled to bus 402.

The term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computing device configured to trigger a sensor operation, the computing device comprising:
    one or more processors; and
    instructions or logic that, when executed by the one or more processors, cause the computing device to perform:
        receiving timestamps from a sensor;
        simulating an operation of the sensor, the simulation including predicting orientations of the sensor at different times based on the received timestamps;
        comparing a latest timestamp of the computing device to a latest timestamp of the sensor;
        based on the comparison, and based on a predicted orientation of the second sensor matching a predicted orientation of the first sensor, triggering a second sensor to capture sensor data;
        writing, into an allocated memory, the sensor data, wherein the allocated memory comprises registers that allocate addresses corresponding to a status, a control, an underflow count, an overflow count, a Lidar count, and a timestamp threshold; and
        navigating a vehicle by controlling a vehicle actuator to implement a throttle action, a braking action, or a steering action according to the captured sensor data.

2. The computing device of claim 1, wherein the comparison of the latest timestamp of the computing device to the latest timestamp of the sensor includes:
    determining whether the latest timestamp of the computing device is after the latest timestamp of the sensor;
    determining whether the latest timestamp of the computing device is within a threshold value of the latest timestamp of the sensor; and
    in response to determining that the latest timestamp of the computing device is after the latest timestamp of the sensor and within the threshold value of the latest timestamp of the sensor, validating the latest timestamp of the computing device.

3. The computing device of claim 2, wherein the triggering of the second sensor includes:
    in response to validating the latest timestamp of the computing device, triggering the second sensor based on the latest timestamp of the computing device.

4. The computing device of claim 2, wherein the comparison further includes:
    in response to determining that the latest timestamp of the computing device is before or a same as the latest timestamp of the sensor or outside of the threshold value of the latest timestamp of the sensor, determining that the latest timestamp of the computing device is invalid.

5. The computing device of claim 4, wherein the triggering of the second sensor includes:
    in response to determining that the latest timestamp of the computing device is invalid, triggering the second sensor based on a most recent timestamp of the sensor that falls within the threshold value of a corresponding timestamp of the computing device.

6. The computing device of claim 4, wherein the triggering of the second sensor includes:
    in response to determining that the latest timestamp of the computing device is invalid, triggering the second sensor based on a most recent timestamp of the sensor that falls within the threshold value of a corresponding timestamp of the computing device, or based on the corresponding timestamp of the computing device, depending on whether historical timestamps of the sensor or historical timestamps of the computing device have smaller deviations compared to timestamps from a GPS.

7. The computing device of claim 1, wherein the sensor includes a LiDAR sensor and the second sensor includes a camera, and the camera is stationary.

8. The computing device of claim 1, wherein the triggering includes:
    determining when a predicted orientation of the sensor matches an orientation of the second sensor; and
    in response to the predicted orientation of the sensor matching the orientation of the second sensor, triggering the second sensor to begin capturing sensor data.

9. The computing device of claim 1, wherein the predicting of the orientations of the sensor is based on an assumption that the sensor rotates at a constant angular velocity.

10. The computing device of claim 1, wherein the instructions or logic further cause the computing device to perform:
    periodically resynchronizing timestamps from the computing device based on a PPS signal from a GPS.

11. The computing device of claim 1, wherein the status is binary and identifies an underflow error or an overflow error, the control identifies a command to clear an underflow error, clear an overflow error, clear an underflow count, clear an overflow count, clear a received lidar timestamp count, or enable a camera trigger, the underflow count identifies a number of counts when a lidar timestamp exceeds a field programmable gate array (FPGA) timestamp, the overflow count identifies a number of counts when a difference between the FPGA timestamp and the lidar timestamp exceeds a time difference threshold, the lidar count identifies a number of times that a lidar packet has been forwarded by an inter-process communication (IPC), and the timestamp threshold identifies a permitted difference between the FPGA timestamp and the lidar timestamp.

12. The computing device of claim 1, wherein the status further comprises an angle interval increment and a camera trigger angle.

13. A computer implemented method performed by a computing device, comprising:
    receiving timestamps from a sensor;
    simulating an operation of the sensor, the simulation including predicting orientations of the sensor at different times based on the received timestamps;
    comparing a latest timestamp of the computing device to a latest timestamp of the sensor;
    based on the comparison, and based on a predicted orientation of the second sensor matching a predicted orientation of the first sensor, triggering a second sensor to capture sensor data;
    writing, into an allocated memory, the sensor data, wherein the allocated memory comprises registers corresponding to a status, a control, an underflow count, an overflow count, a Lidar count, and a timestamp threshold; and
    navigating a vehicle by controlling a vehicle actuator to implement a throttle action, a braking action, or a steering action according to the captured sensor data.

14. The computer implemented method of claim 13, wherein the comparison of the latest timestamp of the computing device to the latest timestamp of the sensor includes:
  determining whether the latest timestamp of the computing device is after the latest timestamp of the sensor;
  determining whether the latest timestamp of the computing device is within a threshold value of the latest timestamp of the sensor; and
  in response to determining that the latest timestamp of the computing device is after the latest timestamp of the sensor and within the threshold value of the latest timestamp of the sensor, validating the latest timestamp of the computing device.

15. The computer implemented method of claim 14, wherein the triggering of the second sensor includes:
  in response to validating the latest timestamp of the computing device, triggering the second sensor based on the latest timestamp of the computing device.

16. The computer implemented method of claim 14, wherein the comparison further includes:
  in response to determining that the latest timestamp of the computing device is before or a same as the latest timestamp of the sensor or outside of the threshold value of the latest timestamp of the sensor, determining that the latest timestamp of the computing device is invalid.

17. The computer implemented method of claim 16, wherein the triggering of the second sensor includes:
  in response to determining that the latest timestamp of the computing device is invalid, triggering the second sensor based on a most recent timestamp of the sensor that falls within the threshold value of a corresponding timestamp of the computing device.

18. The computer implemented method of claim 16, wherein the triggering of the second sensor includes:
  in response to determining that the latest timestamp of the computing device is invalid, triggering the second sensor based on a most recent timestamp of the sensor that falls within the threshold value of a corresponding timestamp of the computing device, or based on the corresponding timestamp of the computing device, depending on whether historical timestamps of the sensor or historical timestamps of the computing device have smaller deviations compared to timestamps from a GPS.

19. The computer implemented method of claim 13, wherein the predicting of the orientations of the sensor is based on an assumption that the sensor rotates at a constant angular velocity.

20. The computer implemented method of claim 13, further comprising: periodically resynchronizing timestamps from the computing device based on a PPS signal from a GPS.

\* \* \* \* \*